Figure 1:
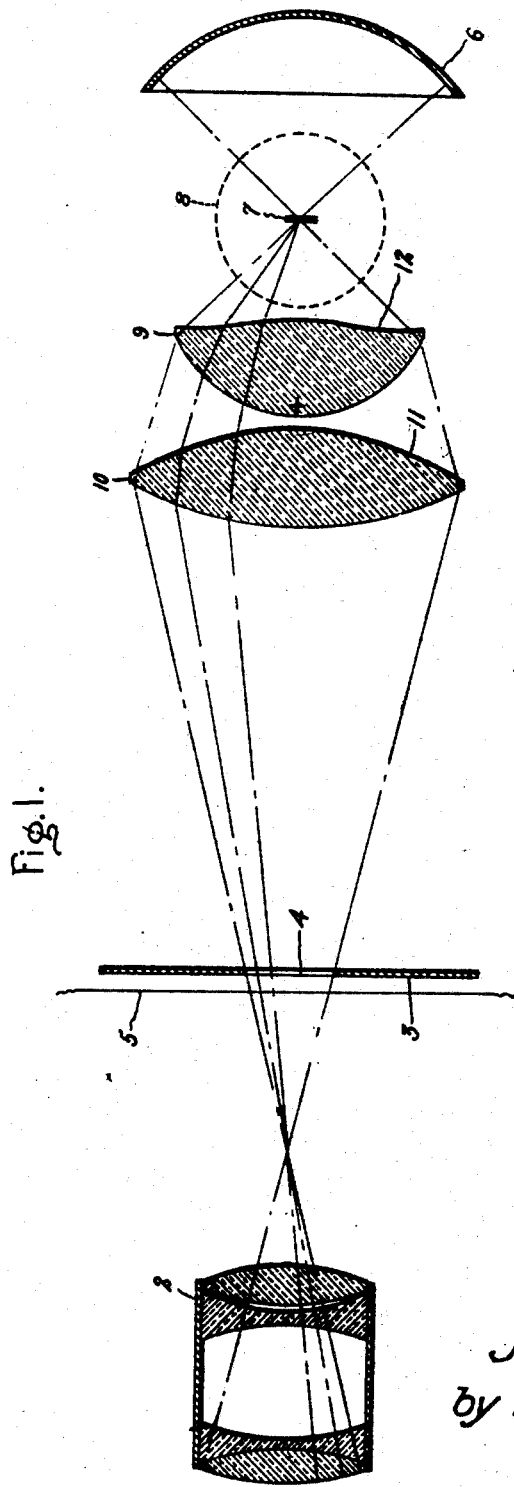

Jan. 25, 1927.

J. T. BEECHLYN 1,615,674

LENS

Filed Oct. 18, 1922

2 Sheets-Sheet 1

Inventor,
John T. Beechlyn,
by Alexander D. Lunt
His Attorney.

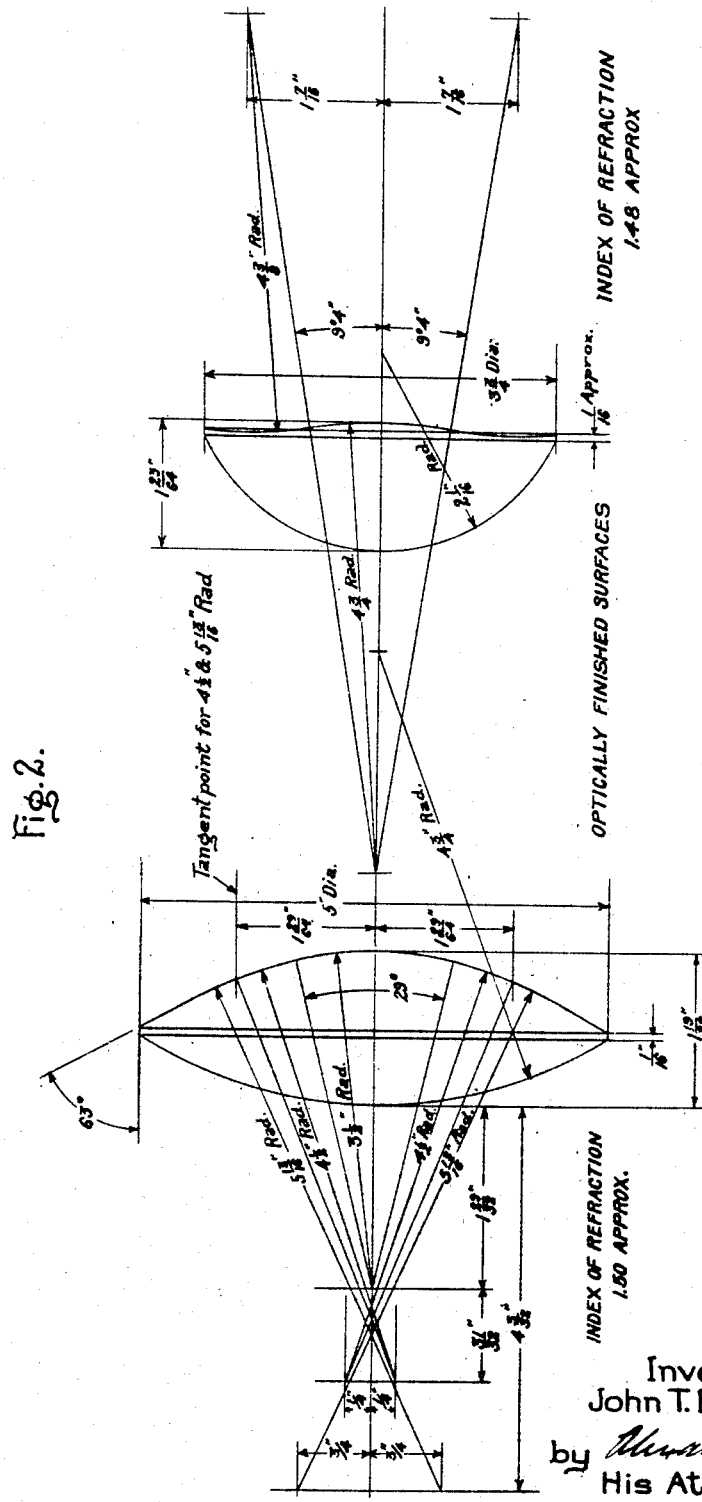

Patented Jan. 25, 1927.

1,615,674

UNITED STATES PATENT OFFICE.

JOHN T. BEECHLYN, OF WORCESTER, MASSACHUSETTS, ASSIGNOR TO GENERAL ELECTRIC COMPANY, A CORPORATION OF NEW YORK.

LENS.

Application filed October 18, 1922. Serial No. 595,429.

My invention relates to improvements in lenses that are specially adapted for use in connection with motion picture projectors and also for use in connection with lantern slides.

Originally the optical system of a stereopticon lantern was adapted for motion picture projection. In this arrangement two plano-convex condensers were used with their distances and relations changed so as to produce illumination as uniformly as possible upon the film area at the aperture. This arrangement functioned in a fairly satisfactory manner inasmuch as the source of light was the arc light which of course is of very high intensity. Such an arrangement however was not particularly efficient or satisfactory in connection with an incandescent filament lamp. As an improvement upon this original construction we have the so-called Fresnel condenser which subtends an angle of about 76 deg. at the light source. This type of lens has been used in connection with the powerful Mazda lamps but the risers are objectionable inasmuch as they tend to produce an uneven field of illumination by causing dark rings which become more and more marked as the diameter of the lens increases. Furthermore, this type of lens is not adapted, for the same reason, for use in connection with lantern slides. Not only the Fresnel type of condenser, but generally the condensers of prior design have focused the rays from each element of condenser surface into an area so nearly equal with that of the aperture that any slight error in the formation of the surface causes at the element a distortion sufficient to uncover the aperture area with reference to said element and thus preventing the maximum effectiveness.

Among the objects of my invention are the following: To provide a lens of such configuration that each element of the surface not only covers the aperture area but overlaps the same by a margin sufficient to prevent any slight distortion of the surface from causing the aperture area to be uncovered; to provide a lens of the above character which is made in two sections, each section having an aspheric face; to provide a lens of the above character which subtends an angle anywhere from 76 to 100 deg. the apex of the angle being at the center of the light source; to provide a lens of the above character which subtends an angle greater than 100 deg.; to provide in combination a light source of such character and a lens of such character that the two may be brought together within a spacing distance of 2½", and also in which the subtending angle is substantially above 76 deg.; to provide an optical system which involves a motion picture projector, a condenser which gives a distribution efficiency greater than heretofore at a distance of not less than 6½" from the aperture; and to provide other details of improvement tending to increase the efficiency and serviceability of the lens which may be used in connection with motion picture or lantern projectors.

The means embodied in my invention for accomplishing the foregoing ends are hereinafter more fully set forth and claimed. Referring to the accompanying drawings, Fig. 1 is a sectional plan view of the elements of the optical system in which the condenser of my design is incorporated. Fig. 2 gives the dimensions of each section of a specific form of the condenser.

In describing my invention in the accompanying specification a clearer understanding of the invention will be had if it is assumed that in the optical system of the projector the objective is a standard lens which has good definition throughout a wide angle and which has a focal length of about 5¾", inasmuch as that with such an objective I obtain an increased illumination of about 50% over that obtained by the average prismatic condenser.

Referring in detail to the drawing, the objective lens 2 is shown at the left. The aperture plate 3 contains the usual aperture 4 through which the light beam is shown projected. Between the aperture plate 3 and the objective lens is located the motion picture film 5. At the extreme right of the drawing is shown the reflector 6 at the focal center of which is the source of light 7 which may be assumed to be the usual type of Mazda lamp, the ring 8 representing the glass wall thereof. To the left of the lamp is shown the two sections 9 and 10 of the condenser lens. The front surface, that is the left hand surface, of each of these two sections is spherical as shown. The right hand surfaces 11 and 12 however are aspherical. It will be observed that the surface 12 is made up of sections having different curvatures.

The dimensions of each of the two sections of the condenser lens are given in the drawing.

In order to appreciate what my new type of condenser lens accomplishes, I will make the following explanation. The object of a condenser system in a motion picture projector is of course to intercept the divergent rays from an initial source and direct these rays through the aperture, thence through the film and the objective lens. The characteristics of the objective lens are determined by its free diameter, angular aperture and focal length all of which have an important bearing on the requirements of the condenser. In general a 2½″ so called No. 2 lens of 5½″ focal length, is considered to represent the maximum transmission requirements and may therefore be used as the basis for the design of a condenser that is to cover the whole field of commercial objectives and I have done this in the design of the condenser of my invention.

If by means of a condenser the entire angle subtended by the objective lens and by the film aperture could be filled with light so that rays of source intensity reached from every point of the film aperture such a condenser might be considered as giving maximum results. In practice this condition is seldom even approached for the reason that there are in the first place losses due to transmission through the optical media which losses due to reflection and absorption may be considered anywhere from 10 to 25%. In the second place there are the losses that are caused by a faulty distribution such as results either from entire dark sections in the field, as when the condenser, due to insufficient diameter, fails to cover the whole angle available with a given objective and as when the condenser surface contains areas which while transmitting some light to the objective and contributing to the screen illumination fails to satisfy every element of the objective aperture that is available for it through the film aperture. This last mentioned failure may, with a given magnification ratio as determined by the location of the optical center of the system, be due to insufficient, defective or noncontinuous source area. It also may be caused by deviations of the transmitted light from its true course due to imperfections of surface or to incorrect curvatures.

Generally speaking, proper conditions of both surfaces and curvatures are not attainable in practice. Thus, the perfect surface obtained by use of plane and spherical surfaces that allow of easy production is accompanied by severe losses through misdirection caused by incorrect contours by causing spherical aberration, while molded lenses of proper contour involve losses by scattering as the result of imperfect moulded surfaces. For the last mentioned reasons the distribution efficiency obtained with condensers specially adapted for use in connection with Mazda lamps has been found to be only in the neighborhood of 65% when used in connection with the No. 2 objective having a 5½″ focus.

In my condenser I have materially raised the distribution efficiency but in order to do this I have increased the customary angle subtended by the condenser at the film. In order to utilize the entire useful field at a spacing of 6½″ I have made use of a lens with a diameter of 5″. Furthermore, I have adopted very efficient directional curvatures in the construction of the rear aspherical faces of each section of the lens. The front surfaces as I have already stated I have left spherical.

In order not to impose too exacting requirements for accuracy of surface curvature the magnification has been increased by placing the optical center of the combination relatively close to the source. In this way a certain surplus is established at the aperture plate for every element of the condenser surface and the mean axis of transmitting light from any such element may be deviated an appreciable angle from its corrected or normal direction without impairing what might be called the 100% field. Looking at it another way if the light flux in the whole system is considered reversed my lens is so designed that any ray emanating at the screen surface that can pass through the objective lens will not only eventually reach the filament area but will strike it well within its outline.

Another source of gain will be found in the fact that since the angle subtended by the condenser has been increased considerably over 76 deg. and may reach as high as 106 deg., in the present lens, the filament will present a substantially continuous tungsten target, with overlapping coils as viewed from a considerable portion (substantially over 65%) of the lens.

Ordinarily correction for aspheric aberration tends to enhance image formation of the filament and this might appear to be an obstacle to the aspherical lens inasmuch as the essential result is a uniform field, but in the case of my lens there are certain factors which tend to offset this as, for example, the greater aperture of the new lens and also its large aperture overlapping field. Both of these features tend toward limiting the axial depth of definite focus. On the other hand, the smaller the aperture the greater the focal depth as illustrated by a pinhole aperture. However, in the condenser of my design I have taken pains to have the focal plane well beyond the aperture plate so that no definite image can occur at the aperture plate. I might add that on account of the large intake angle due to the high aperture value of the condenser with respect to the source, there is a great dissimilarity of images from different parts of the lens, particularly so as the filament possesses three dimensions. These images overlap due to the increasing angle of perspective from the center toward the rim of the lens.

It will be seen therefore that a lens of the foregoing construction yields greater uniformity in illumination as well as delivering a greater amount of light at the screen. Tests made in connection with objective lenses of good definition throughout a wide angle and with focal lengths of 5¾" show an increase in luminance on the screen in the neighborhood of 50% over the best results obtained with the standard prismatic type of condensers. The relation of the parts when the tests were made is indicated in the drawing.

It will be understood that altho I have given specific dimensions in the drawings and specification for the specific form of the lens shown, I do not intend to be limited to any such specific construction inasmuch as my invention can be practiced through a considerable range of variation. For example, the condenser may be placed in such relation to the source of light that the distance betwen the point on the major axis of the aspheric face of the section of the condenser nearest the source of light and the source of light may be any suitable distance up to and about 2½".

What I claim as new and desire to secure by Letters Patent of the United States, is:

1. A condenser for a light projector having two lens sections, each section having a front face and a back face, each of the faces consisting of a continuous surface from center to rim, one of said faces in each of said sections being aspheric, the degree of curvature of one of the aspheric faces decreasing as the circumference of the section of the condenser is approached, the other aspheric face having a negative and a positive curvature.

2. A condenser lens for a motion picture projector consisting of two sections each section having a spherical surface similarly located with respect to the light source and each section having an aspheric surface similarly located with respect to the light source, one aspheric surface consisting of two zones one positively and one negatively curved and the other aspheric surface consisting of a series of toric zones each having a different radius of curvature.

3. For use in connection with a light source, a condenser having two lenticular elements, said elements having a common optical axis, one of the elements located in advance of the other along the said axis with respect to the light source, each element having a front face toward the light source and a back face away from the light source, each face forming a continuous surface, the back faces being each spherical convex and the front faces being each aspheric, the curvature of the spherical face of the element nearest the light source being greater than that of the face of the element farthest away from the light source.

4. For use in connection with a light source, a condenser having two lenticular elements, said elements having a common optical axis, one of the elements located in advance of the other along the said axis with respect to the light source, each element having a front face toward the light source and a back face away from the light source, each face forming a continuous surface, the back faces being each convex and the front faces being each aspheric, one of the aspheric faces having a number of concentric toric zones, the curvature of each zone being greater than that of any one of the other zones nearer the periphery of the element.

5. For use in connection with a light source, a condenser having two lens elements, said elements having a common optical axis, one of the elements located in advance of the other along the said axis with respect to the light source, each element having a front face toward the light source and a back face away from the light source, each face forming a continuous surface, the back faces being each convex and the front faces being each aspheric, one of the aspheric faces having a positive curvature and having also a negative curvature.

6. For use in connection with a light source, a condenser having two lens elements, said elements having a common optical axis, one of the elements located in advance of the other along the said axis with respect to the light source, each element having a front face toward the light source and a back face away from the light source, each face forming a continuous surface, the back faces being each convex and the front faces being each aspheric, one of the aspheric faces having a positive curvature and having also a negative curvature, the positive and the negative curvature of the aspheric face being less than that of the opposite face of the same element.

7. For use in connection with a light source, a condenser having two lenticular elements, said elements having a common optical axis, one of the elements located in advance of the other along the said axis with respect to the light source, each element having a front face toward the light source and a back face away from the light source, each face forming a continuous surface, the back faces being each convex and the front faces being each aspheric, the diameter of the element nearest the light source being smaller than that of the other element.

8. For use in connection with a light source, a condenser having two lens elements, said elements having a common optical axis, one of the elements located in advance of the other along the said axis with respect to the light source, each element having a front face toward the light source and a back face away from the light source, each face forming a continuous surface, the back faces being each convex and the front faces being each aspheric, one of the aspheric faces having a positive curvature and having also a negative curvature, the diameter of the element having the negative curvature being smaller than that of the other element.

9. For use in connection with a light source, a condenser having two lens elements, said elements having a common optical axis, one of the elements located in advance of the other along the said axis with respect to the light source, each element having a front face toward the light source and a back face away from the light source, each face forming an optically continuous surface, the back faces being each convex and the front faces being each aspheric, one of the aspheric faces having a positive curvature and having also a negative curvature, the positive curvature of the aspheric face being less than that of the opposite face of the same element.

In witness whereof, I have hereunto set my hand this 14th day of October, 1922.

JOHN T. BEECHLYN.